(12) United States Patent
Jeha

(10) Patent No.: US 6,694,652 B1
(45) Date of Patent: Feb. 24, 2004

(54) THREE DIMENSIONAL SIGNAGE

(76) Inventor: George Jeha, 2482 Maynard Street, Halifax, Nova Scotia (CA), B3K 3V4

(*) Notice: Subject to any disclaimer, the term of this patent is extended or adjusted under 35 U.S.C. 154(b) by 0 days.

(21) Appl. No.: 09/486,645
(22) PCT Filed: Sep. 4, 1998
(86) PCT No.: PCT/CA98/00837
§ 371 (c)(1), (2), (4) Date: Mar. 29, 2000
(87) PCT Pub. No.: WO99/13447
PCT Pub. Date: Mar. 18, 1999

(30) Foreign Application Priority Data
Sep. 6, 1997 (GB) .............................................. 9718895

(51) Int. Cl.$^7$ .......................... G09F 19/00; G09B 21/02
(52) U.S. Cl. ........................................ 40/615; 434/113
(58) Field of Search ................ 40/299.01, 616, 40/671, 615, 675; 434/113

(56) References Cited

U.S. PATENT DOCUMENTS

| | | | | |
|---|---|---|---|---|
| 5,246,757 A | * | 9/1993 | Condon et al. | 40/616 X |
| 5,336,458 A | * | 8/1994 | Hutchison et al. | 264/220 |
| 5,389,413 A | * | 2/1995 | Condon et al. | 40/616 X |
| 5,487,203 A | * | 1/1996 | Brach, Jr. et al. | 40/586 X |
| 5,536,545 A | * | 7/1996 | Condon et al. | 40/616 X |
| 5,720,616 A | * | 2/1998 | Schuler, III | 434/113 |
| 5,779,919 A | * | 7/1998 | DiPietro et al. | 40/615 X |

FOREIGN PATENT DOCUMENTS

| | | | |
|---|---|---|---|
| GB | 2263354 | * | 7/1993 |
| WO | 97/23858 | * | 7/1997 |

* cited by examiner

Primary Examiner—Brian K. Green
(74) Attorney, Agent, or Firm—David J. French

(57) ABSTRACT

A raised surface sign with a Braille portion (8) has a reference notch (13) or elevation along its outside border to serve as a Braille locator. The visual presence of the notch or elevation is masked by an underlying colored layer (12) that spans the Braille locator and is of the same color as adjacent areas of the sign.

12 Claims, 11 Drawing Sheets

CROSS SECTION AA**

CROSS SECTION BB**

CROSS SECTION CC**

CROSS SECTION EE**

CROSS SECTION DD**

CROSS SECTION FF**

CROSS SECTION HH**

CROSS SECTION GG**

CROSS SECTION II**

CROSS SECTION JJ

CROSS SECTION KK

CROSS SECTION LL

CROSS SECTION MM**

CROSS SECTION NN**

CROSS SECTION OO**

THREE DIMENSIONAL SIGNAGE

FIELD OF THE INVENTION

This invention relates to signs and indicators that have raised surfaces to permit reading by the blind.

BACKGROUND TO THE INVENTION

Raised letter signage has become increasingly employed in order to assist persons who are visually impaired. Besides having normal alphabetic letters that are raised, such signs may also include information written in Braille.

When a sign has Braille lettering, a person who is blind must tactically search over the surface of the sign to locate the Braille lettering. This is time consuming and frustrating.

It is known to provide a key locator at a standard position on a sign carrying Braille which serves to guide a blind person in locating the Braille text. An example is a notch formed in the periphery of the sign along its left, vertical edge. The Braille text may then be positioned horizontally to the right of the notch, and is thereby readily locatable. A reference to prior art; U.K. Patent Application GB 2 263 354A addresses a similar objective.

It is known to produce raised-surface signage by a lamination procedure that provides a sign composed of multiple layers. These layers may be of differing colours, enhancing the ease with which sighted persons may see the lettering on the sign. Examples of patents addressing this technology are U.S. Pat. Nos. 5,246,757, 5,346,571 and 5,389,413 to R. R. Condon et al.

The lamination techniques of the foregoing patents produce 3-D sign face constructions comprising in sequence:

(a) a conformed laminate comprising in sequence:
 (1) a sign face layer, wherein the sign face layer is a semi-rigid or rigid conformable thermoplastic sheeting;
 (2) a first adhesive layer;
 (3) one or more foreground visual characters, wherein the visual characters are cut from a cuttable conformable material having a thickness in the range of 1–5 mils;
 (4) a second adhesive layer;
 (5) a background colour layer, wherein the background colour layer is conformable material;
 (6) a third adhesive layer;
(b) one or more 3-D characters positioned in register with the visual characters, wherein the 3-D characters are cut from a cuttable material having a thickness in the range of 10–50 mils;
(c) raised braille characters that protrude above the normal surface of the sign face layer.

Further, a substrate layer in the form of a rigid backing such as plastic may, in practice underlie the 3-D layer and extend to the edge of the sign.

The adhesive layers in the prior patent reference need not be physically separated from the cuttable, conformable material or the 3-D cuttable material during assembly. These materials may be manufactured so that they carry a self-adhesive coating, like a peel and stick label.

In the past it has been customary to cut a reference notch as a Braille locator in the edge of such a sign in a manner that removes a portion of the background colour layer and substrate, if present. This results in a sign wherein the reference notch is clearly visible against environmental background surfaces that are typically of a colour which contrasts with the background colour layer of the sign. This is aesthetically unattractive. Usually the background colour of the sign does contrast with the environmental background surface because a good contrast enables low-vision persons to locate the sign easily and this feature is usually required by specifiers and customers.

It is an objective of this patent to provide along an outer edge or within the sign (when there is a surrounding border) raised surface signage having a Braille location indicator that is elevated or depressed below the level of the adjacent surface to provide a guide to locating the Braille characters which is not readily apparent to sighted persons.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention, in a raised surface sign with a Braille portion located on the surface of a rincipal layer of the sign, which principal layer also has a Braille position indicator or Braille locator positioned along its outside border in the form of a region that is elevated above or depressed below the surface area adjacent thereto, the visual presence of the Braille locator is masked by a coloured layer that spans the Braille locator and is of the same colour as adjacent areas of the principal layer.

According to a further aspect of the invention, a 3-D sign construction is provided which comprises:

(1) a sign face layer, wherein the sign face layer comprises a substantially transparent, conformable, thermoplastic shooting having an exposed face surface with Braille characters raised thereon;
(2) one or more visual characters underlying the sign face layer;
(3) one or more raised, 3-D characters in the form of a 3-D layer positioned beneath and in register with the visual characters;
(4) a principal background colour layer, underlying either the visual characters or both the visual characters and the 3-D characters and having an outer colour layer border; and
(5) a substrate layer underlying the principal background colour layer and having a substrate underside surface and a substrate border with a region that is elevated above or depressed below the adjacent surface area to form a Braille locator reference region, and that provides, at a location along its extent, a Braille locator that is a region within the sign that is elevated above or depressed below the adjacent surface area to such region, wherein the Braille locator region is spanned by a coloured spanning surface that is part of the principal background colour layer or is of the same colour as the principal background colour layer to minimize visual contrast along the substrate border between the Braille locator region and the background colour layer. Preferably, the Braille locator is aligned with the Braille characters.

Adhesive layers, where required, may be interposed between the layers as listed above.

The coloured Braille locator region spanning surface may be provided by a portion of the principal background colour layer. Or, optionally, the sign construction of the invention may comprise, in the case of a recessed Braille locator, a secondary background layer that spans the locator region in the plane of said substrate underside surface. Such secondary background layer may be coloured over such region to provide said Braille locator region spanning surface. In either case, it is preferable for the sign face layer to span the reference region as well.

A principal distinction over the prior art is that a coloured surface spans the plane of the Braille locator region to minimize the contrast between the locator region and the principal background colour layer. This is true even when the sign includes an extended outer border that protrudes beyond the substrate border. Such extended border may be provided by a backing of a colour that differs from the colour of the principal background colour layer. When such backing is present the Braille locator region may be spanned by a coloured surface that does not contrast with the principal background layer.

The order of the layers may allow the principal background colour layer to either underlie both the visual characters and 3-D layer, or be positioned intermediate the visual characters and 3-D layer, as described in the prior art patents. The sign face surface may span not only the Braille locator region and the vertical sides of the Braille locator region and substrate boundary, but may also span the extended border, if present.

Preferably, the visual characters are cut from a cuttable material having a thickness in the range of 1–5 mils and the 3-D characters are cut from a cuttable material having a thickness in the range of 10–50 mils.

Preferably, the Braille characters raised from the face surface of the sign face layer, and optionally through the background colour layer, are filled with a filler, such as a chemically activated 2-part epoxy. This is to prevent the Braille from collapsing, and to deter vandalism.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1A:
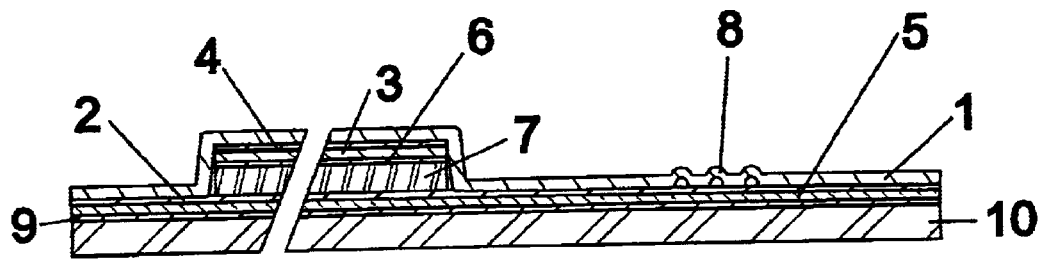
FIG. 1A depicts a vertical, cross-section of the composite layers of a prior art sign having raised visual graphics and Braille and a fully notched Braille locator.
Figure 1B:
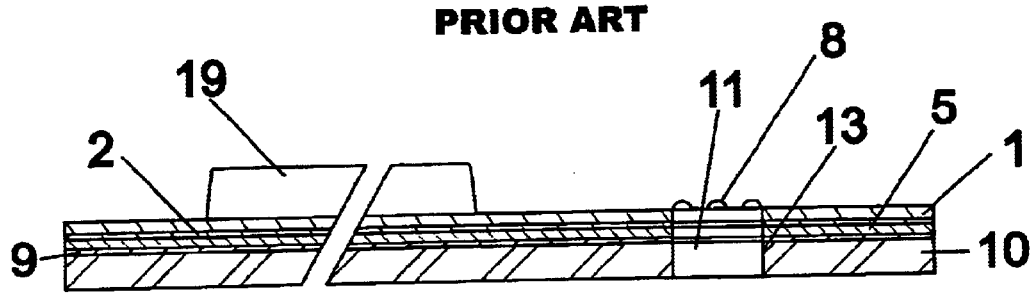
FIG. 1B depicts a second vertical cross-section of the composite layers of the prior art sign of FIG. 1A taken through the notch in one plane.
Figure 1C:
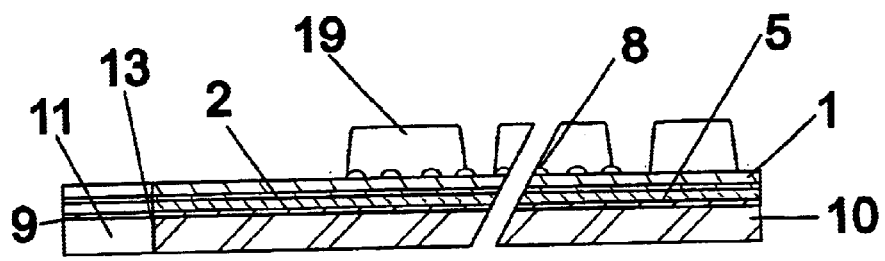
FIG. 1C depicts a third vertical cross-section through the sign of FIGS. 1A and 1B, taken through the notch in a second plane.
Figure 2A:
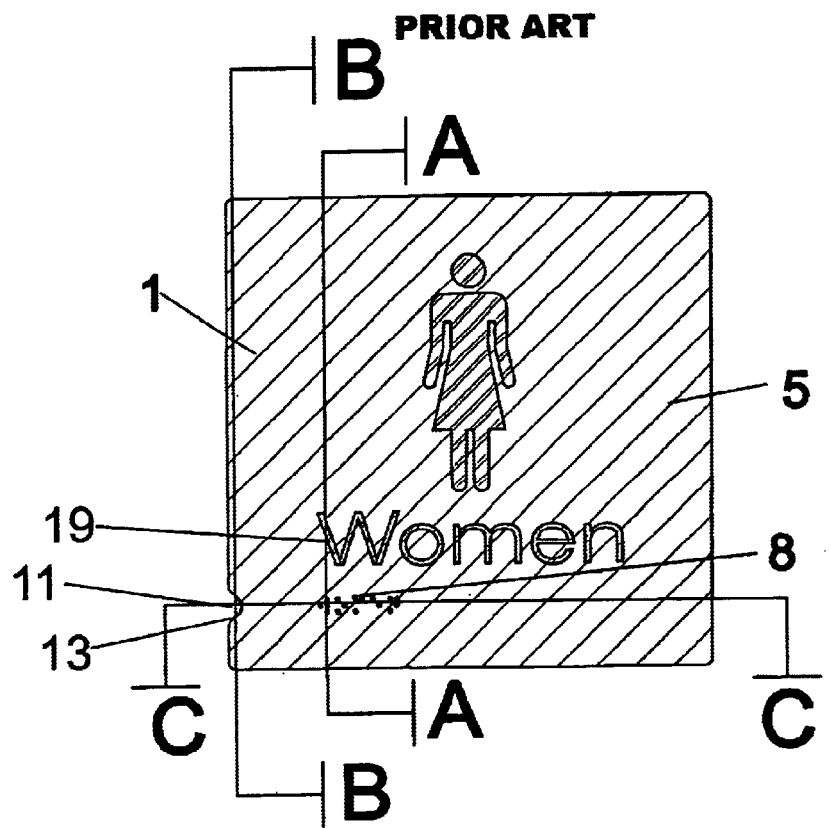
FIG. 2A depicts a plan view of the sign of FIGS. 1A through 1C.
Figure 2B:
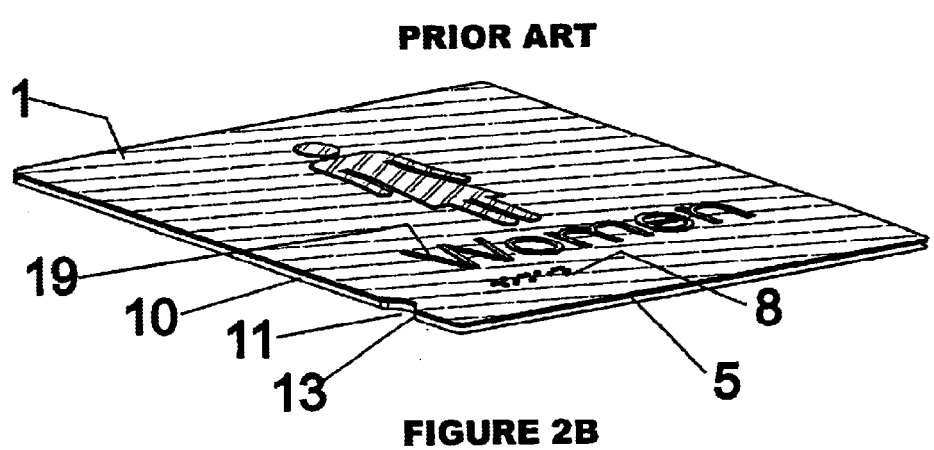
FIG. 2B depicts an isometric view of the sign of FIGS. 1A through 1C.

FIGS. 1A to 1C and 2A and 2B depict a prior art sign in which the layers of the sign commence, proceeding from the visible face, with:

a) a sign face layer 1 having a visual character 3 adhesively laminated to layer 1 by adhesive layer 4 with Braille characters 8 embossed through layer 1;

b) a 3-D character 7 adhesively fastened by adhesive layer 6 to the layer 3 of visual character;

c) a first background colour layer 5 adhesively fastened by adhesive layer 2 to and beneath layers 7, 3 and 1;

d) a substrate carrier layer 10 adhesively fastened to layer 5 by adhesive layer 9;

e) a Braille locator notch 11 formed on the vertical peripheral edge of the sign and located in alignment with Braille characters 8.

Along the border in prior art signs, a front-to-back notch 11 has been previously cut in the edge of the sign as a reference for locating the Braille lettering 8. The edges of such notch 11 have previously exposed the sides of the various layers. The signs made in accordance with this invention provide a modified treatment for this notch and for the edges of the various layers.

The prior art sign of FIGS. 1A through 1C and 2A, 2B differs from the arrangements of U.S. Pat. Nos. 5,246,757; 5,346,571 and 5,389,413 (referenced above) in the order of assembly of the layers. The sequence is changed in the depicted signage by the feature that the visual character and the 3-D layers are assembled by first laminating them together and then cutting both to form the shape of characters as a unit. This eliminates the very awkward and time consuming task of registering the two layers after the visual characters have been covered by the intervening background coloured layer. In the prior art method, the background colour layer is located between the visual character layer and the 3-D layer, which makes registering the two character elements more difficult. The present invention applies irrespective whether this earlier method is employed or whether the background colour layer is applied below both the laminated character and 3-D layer, so that the former alignment procedure is no longer necessary.

Figure 3A:
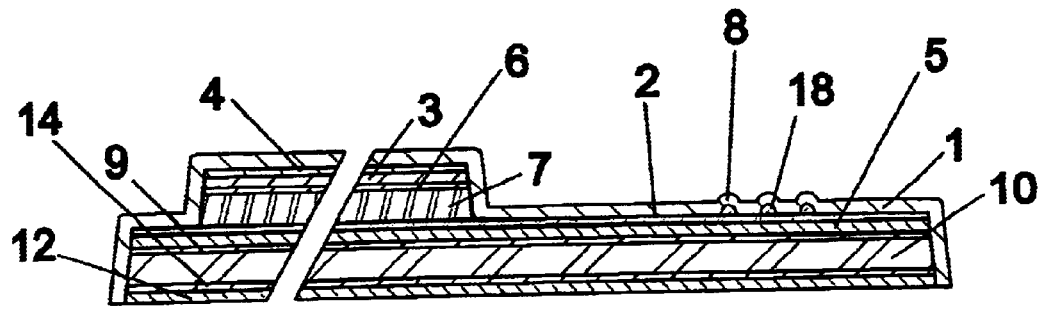
FIG. 3A is a first vertical cross-sectional view through a notched sign according to the invention, having raised visual graphics and Braille.
Figure 3B:
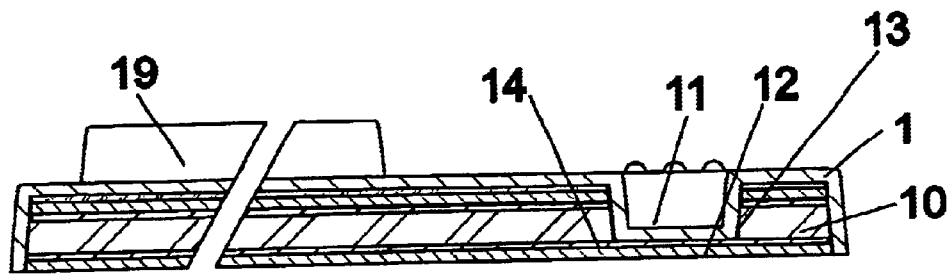
FIG. 3B is a second vertical cross-sectional through a notched sign as in FIG. 3A taken through the Braille locator notch in one plane wherein the background colour layer spans the notched region.

In FIGS. 3A through 3B a sign in accordance with the invention using a notch as the Braille locator region is constructed as follows. The layers of the sign commence, proceeding from the visible face, with:

a) a transparent or translucent sign face layer 1 with Braille characters 8 embossed through layer 1 and having a visual character 3 adhesively laminated to layer 1 by adhesive layer 4;

b) a 3-D character 7 adhesively fastened by adhesive layer 6 to visual character layer 3;

c) a first background colour layer 5 of a different colour from the visual characters 3 adhesively fastened by adhesive layer 2 to 3-D and sign face layers 7 and 1;

d) a notched substrate layer 10 adhesively fastened to background colour layer 5 by adhesive layer 9, such notched substrate layer 10 having a notch 13 formed in the border 31 of the substrate layer 10 and aligned with the Braille characters 8 to serve as a Braille locator 11; and e) a second background colour layer 12 having the same colour as layer 5, adhesively fastened to notched substrate layer 10 by adhesive layer 14 to span Braille locator 11.

Figure 3C:
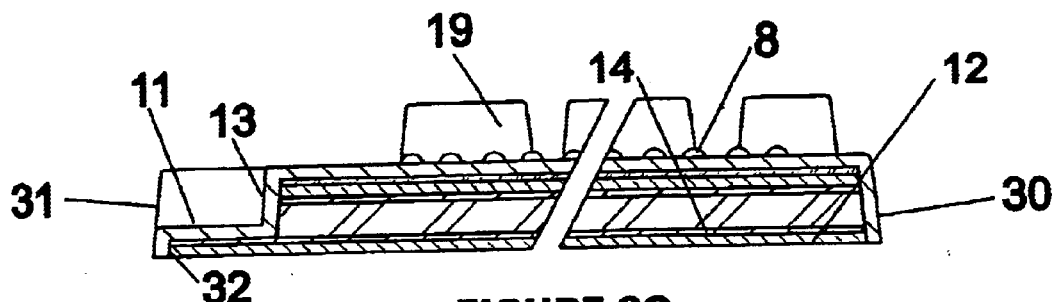
FIG. 3C is a third vertical cross-section of the sign of FIG. 3B taken through the notch in a second plane.

In FIGS. 3B, 3C both the substrate 10 and first background colour layer 5 have been notched prior to being bonded to the face layer 1. The second colour background layer 12 has a border 32 that is virtually aligned with the border 31 of the substrate 10, except that it spans the region of the notch 13.

Figure 4A:
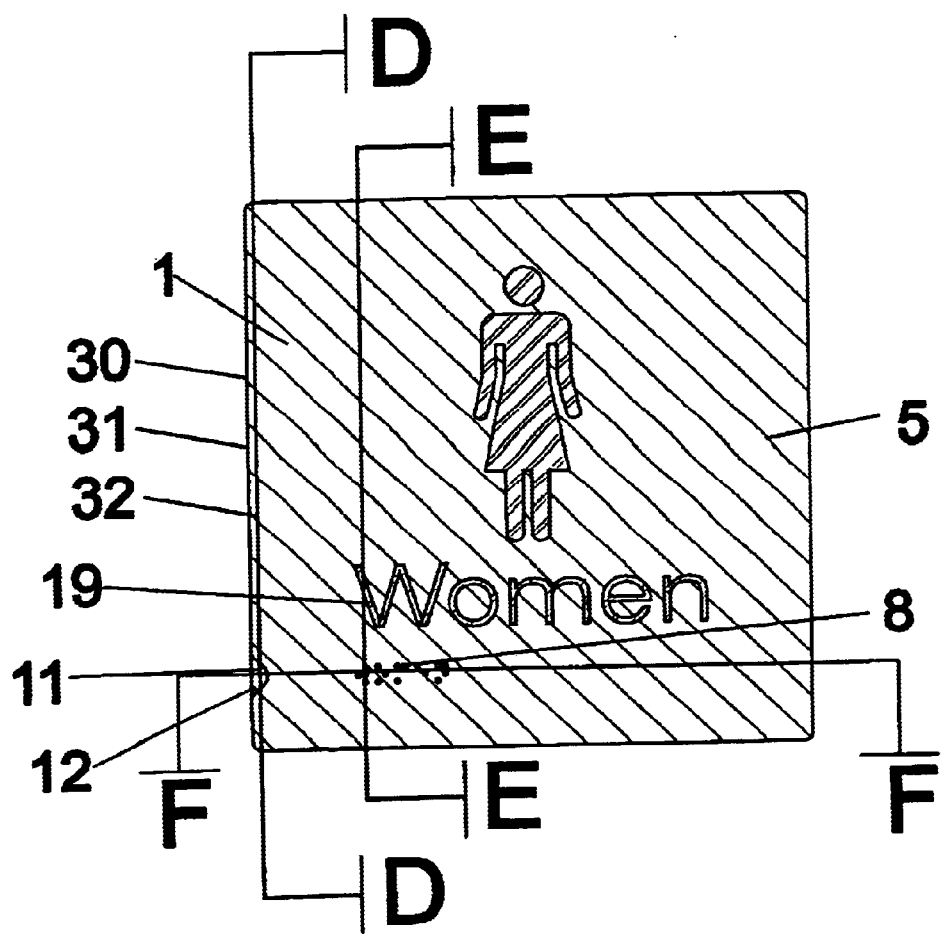
FIG. 4A is a plan view of the sign of FIGS. 3A, 3B and 3C.
Figure 4B:
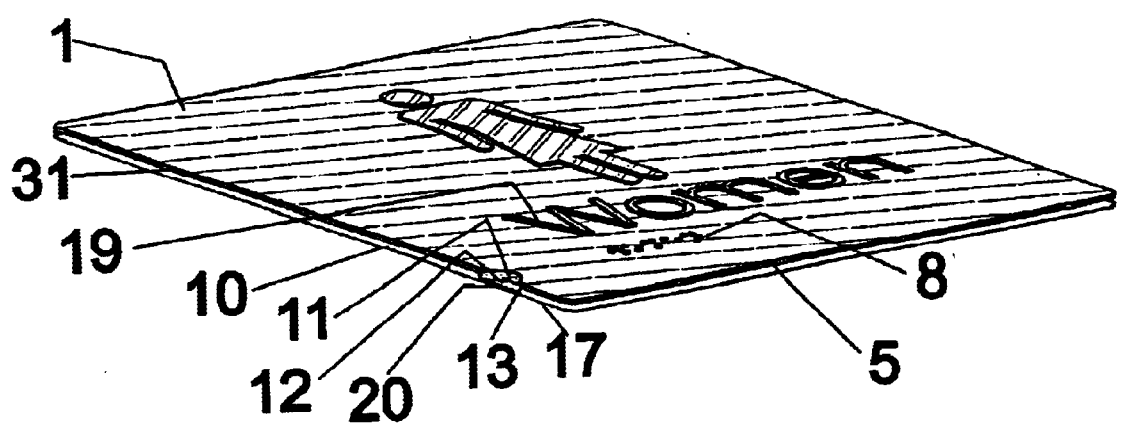
FIG. 4B is an isometric view of the sign of FIGS. 3A, 3B and 3C.

The result, shown in FIG. 4, is that the presence of the notch 13 in the substrate 10 is not readily apparent, as the second colour background layer 12 masks any contrast that would otherwise arise.

Optionally, and preferably, the sign face layer 1 envelopes the vertical faces of the edges of the respective layers as at the location 30 identified in FIG. 3C and along the border of the notched region. This precludes finger contact with the ends of the layers which could lead to de-lamination.

Figure 5A:
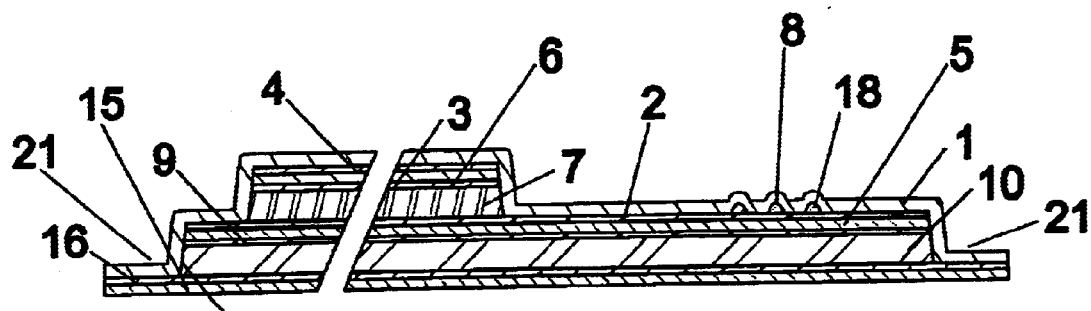
FIG. 5A depicts a first vertical cross-section through a notched sign according to a different variant of the invention having raised visual graphics and Braille and a perimeter border differing in colour from the background colour layer.
Figure 5B:
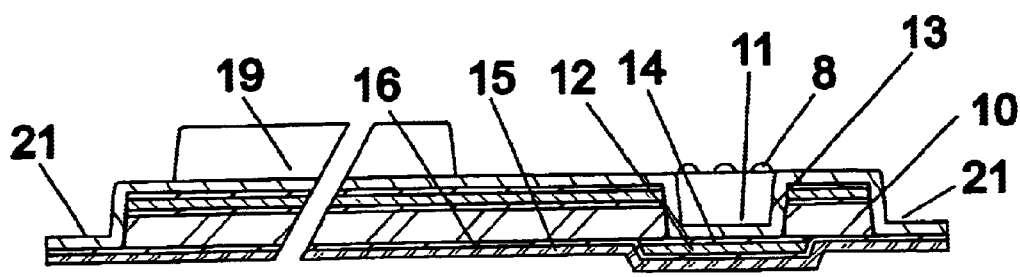
FIG. 5B depicts a second vertical cross-section through the notch of the notched sign of FIG. 5A, where a coloured surface of the same colour as the background colour layer spans the notched Braille locator region as in FIG. 3B.
Figure 5C:
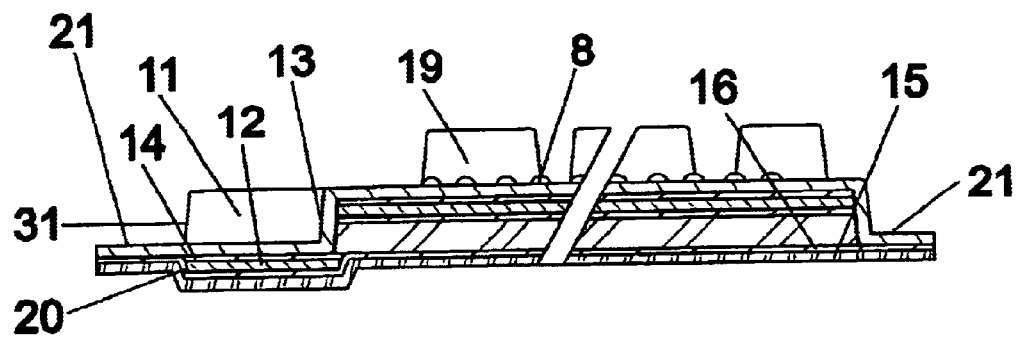
FIG. 5C depicts a third, vertical cross-section through the notch of the sign of FIGS. 5A and 5B.

In FIGS. 5A, 5B and 5C the layers of the sign commence, proceeding from the visible face, with:

(a) a transparent or translucent sign face layer 1 having Braille characters 8 embossed therethrough (optionally filled with two-part catalytic filler 18) the sign face layer 1 being bonded to a coloured (or white or black) visual character 3 by adhesive layer 4;

(b) a 3-D character layer 7 adhesively fastened by adhesive layer 6 to visual character layer 3;

(c) a first background colour layer 5 of a differing colour from the character layer 3 adhesively fastened by adhesive layer 2 to layers 7 and 1;

(d) a notched substrate layer 10 adhesively fastened to first background colour layer 5 by adhesive layer 9, such substrate layer 10 having a notch 13 in the substrate border 17, aligned with the Braille characters 8 to serve as a Braille locator 11;

(e) a second background colour layer 12 preferably but not necessarily having the same colour as the first colour layer 5, adhesively fastened to substrate layer 10 by adhesive layer 14, to span the notch 13; and a second substrate layer 15 that serves as a backing having an extended perimeter adhesively fastened to layers 12, 10 and 1 by adhesive layer 16. This creates a perimeter border 21 which may, optionally, be different in colour from the colour of background colour layer 12 in order to "frame" the sign.

Figure 6A:
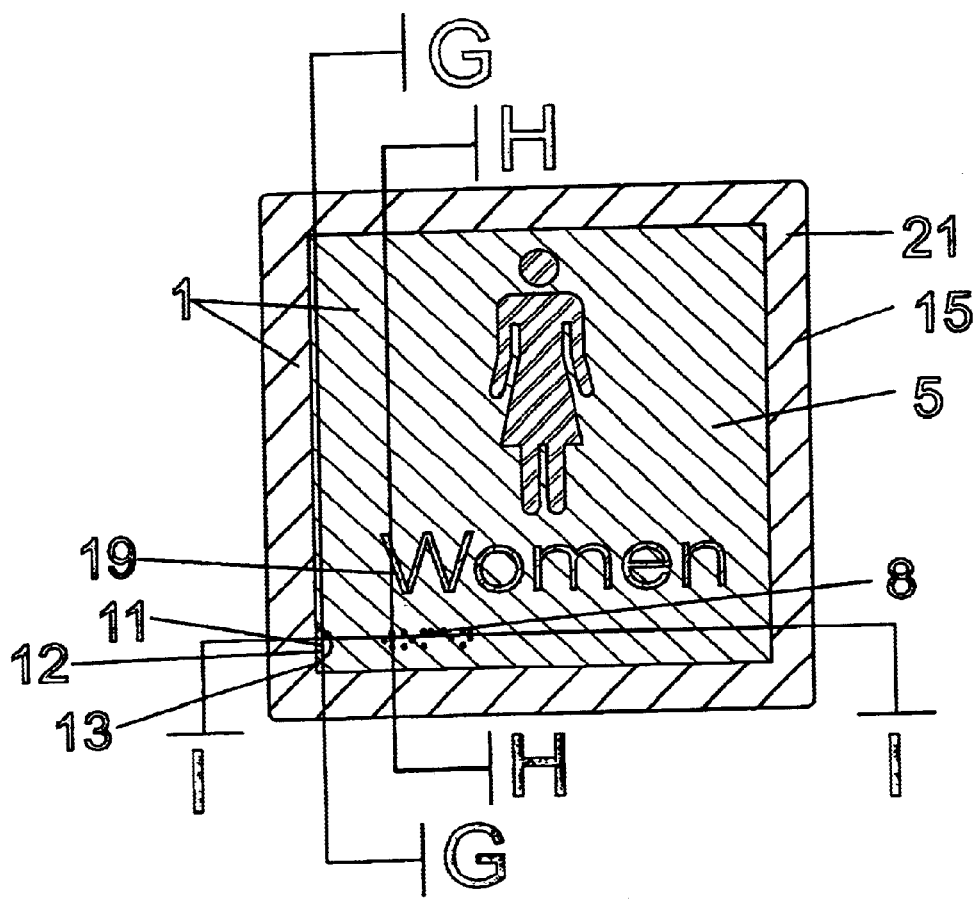
FIG. 6A is a plan view of the sign of FIGS. 5A through 5C.
Figure 6B:
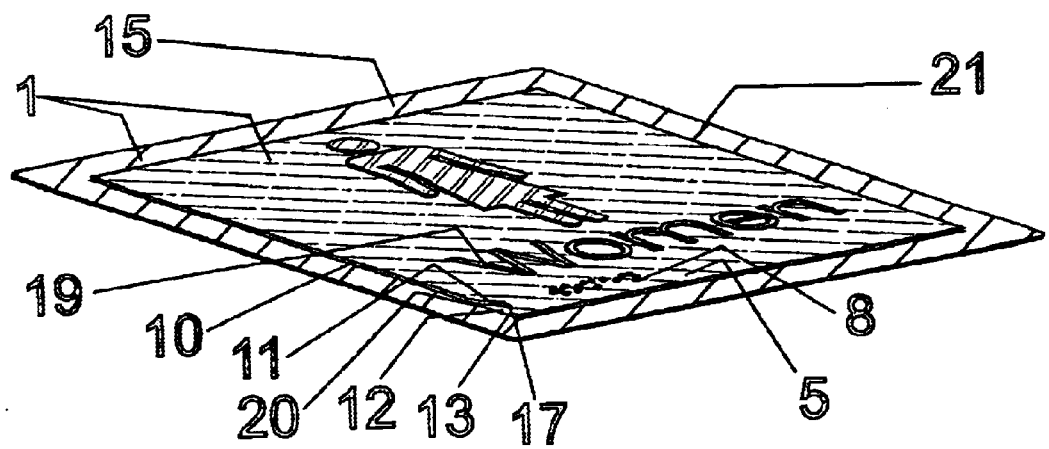
FIG. 6B is an isometric view of the sign of FIG. 6A.

In FIGS. 5A, 5B and 5C, the second background colour layer 12 need only span the notch 13 rather than coincide entirely with the substrate 10. The second background colour layer 12 retains a border 20 that is aligned with the border 31 of the substrate 10, spanning the region of the notch 13. The result, shown in FIGS. 6A and 6B, is that the presence of the notch 13 in the substrate 10, is not readily apparent, as the second coloured background layer 12 masks any contrast that would otherwise arise.

Figure 7:
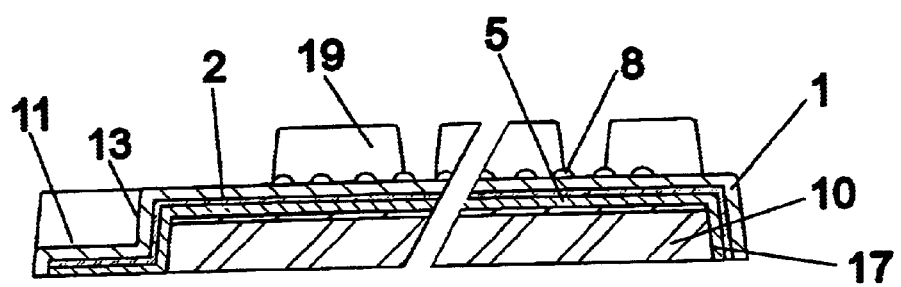
FIG. 7 is a vertical cross-sectional view of a variant on the sign of FIG. 3C wherein the sign face layer wraps around to cover the vertical edges of the sign.
Figure 8A:
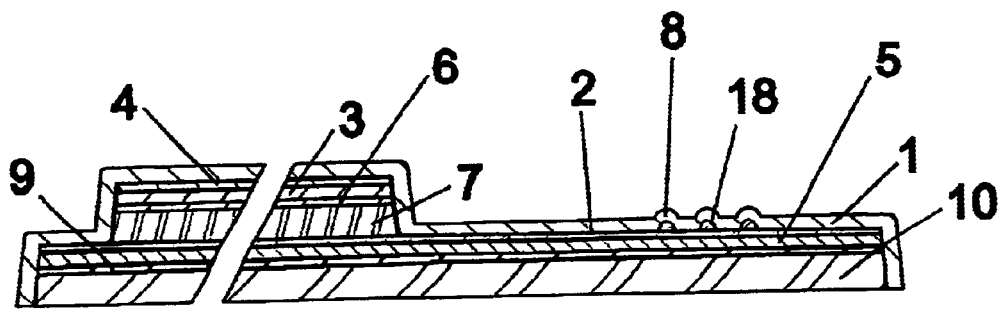
FIGS. 8A and 10A are first vertical cross-section views through a raised region according to the variant of the invention having raised visual graphics and a raised Braille locator.
Figure 8B:
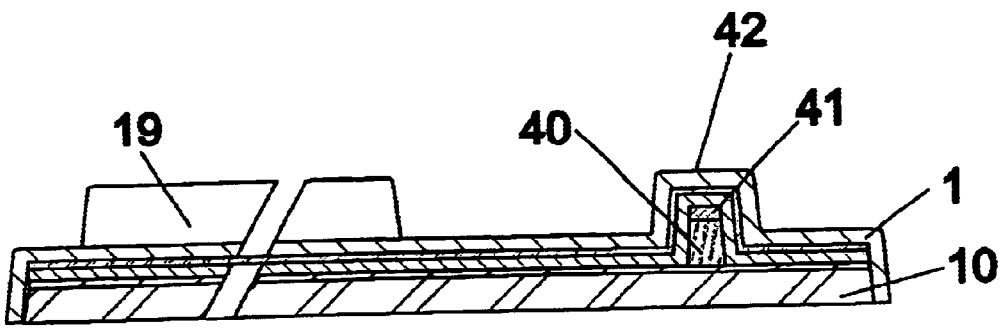
FIGS. 8B and 10B are second vertical cross-sections through a raised region sign as in FIG. 8A, taken through the raised region in one plane.
Figure 8C:
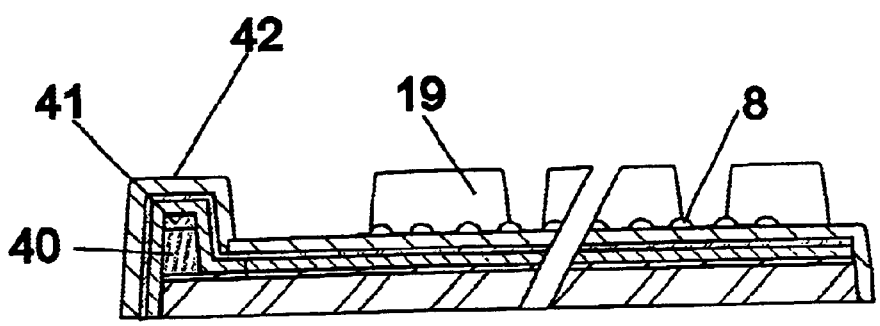
FIGS. 8C and 10C are third vertical cross-sections of the sign in FIGS. 8B and 10B taken through the raised region in a second plane.

In FIG. 7 the first background colour layer 5 extends downwardly beneath and with the face layer 1 along the outside border 17 of the substrate 10. In the region of the notch 13, the first background colour layer 5 then spans the notch 13 in its lower plane. This dispenses with the need to provide a second background colour layer.

Both the face layer 1 and first background colour layer 5 are preferably made of a polymeric plastic sheeting material that may be heat and/or pressure deformed to conform to the shape of the substrate 10 which they overlie.

In FIGS. 8A through 8C and 10A through 10C a sign in accordance with the invention relying on a raised surface as the Braille locator is constructed as follows. The layers of the sign commence, proceeding from the visible face with:

a) a transparent or translucent sign face layer 1 with Braille characters 8 embossed through layer 1 and having a visual character 3 adhesively laminated to layer 1 by adhesive layer 4;

b) a 3-D character 7 adhesively fastened by adhesive layer 6 to visual character layer 3;

c) a first background colour layer 5 of a different colour from the visual characters 3 adhesively fastened by adhesive layer 2 to 3-D and sign face layers 7 and 1;

d) a 3-D reference shape 40 adhesively fastened to background colour layer 5 by adhesive layer 41, creating a raised Braille locator 42.

Figure 9A:
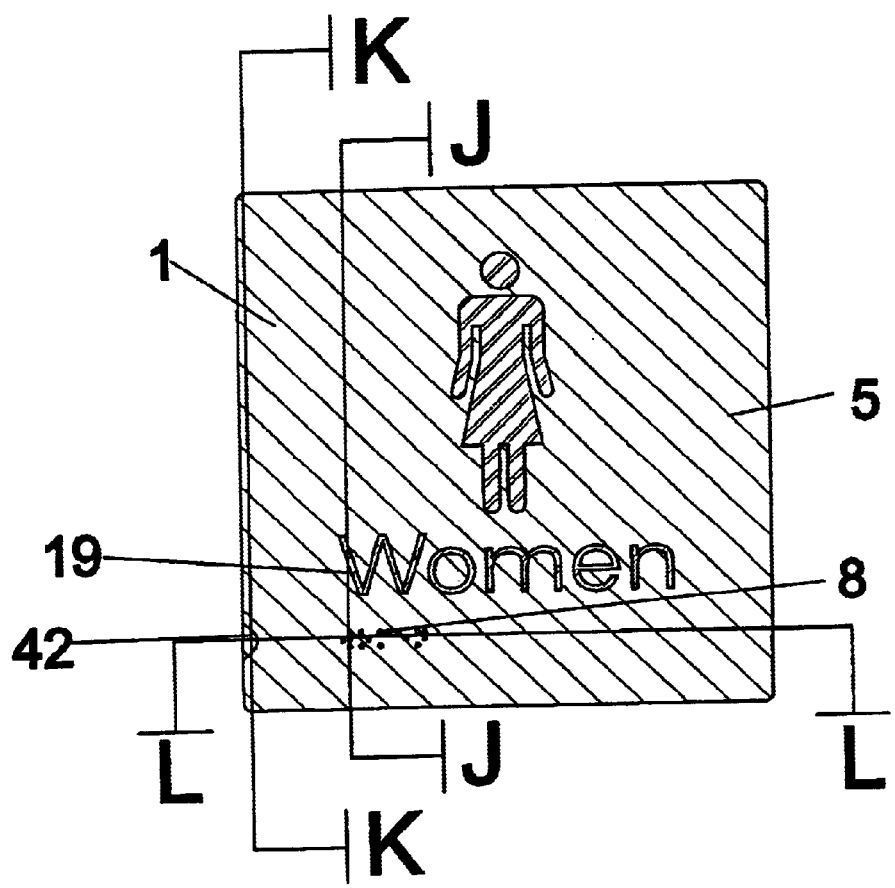
FIGS. 9A and 11A are plan views of the sign of FIGS. 8A, B and C and 10A, B and C.
Figure 9B:
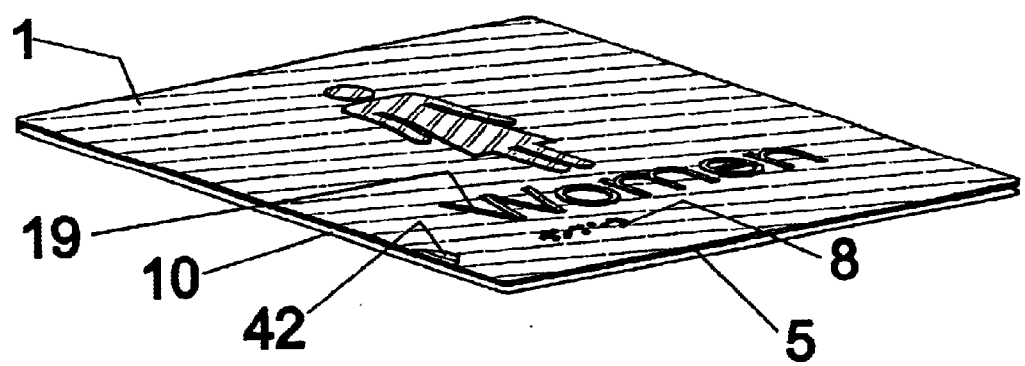
FIGS. 9B and 11B are isometric views of the sign of FIGS. 8A, B and C and 10A, B and C.
Figure 10A:
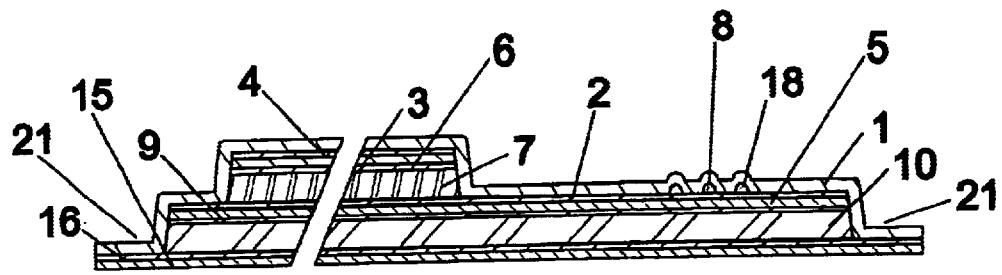
Figure 10B:
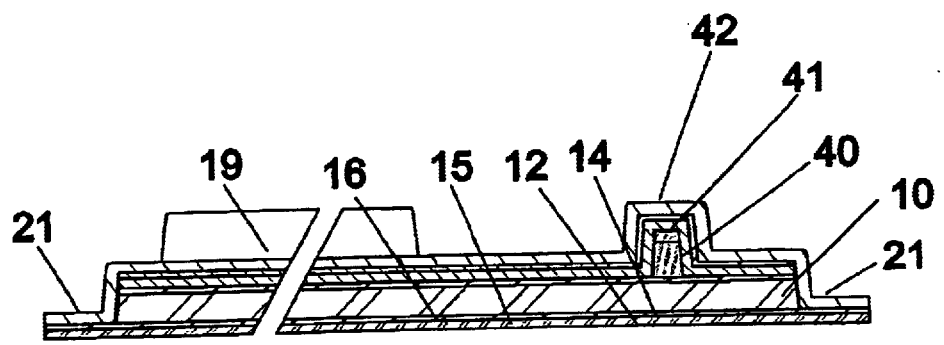
Figure 10C:
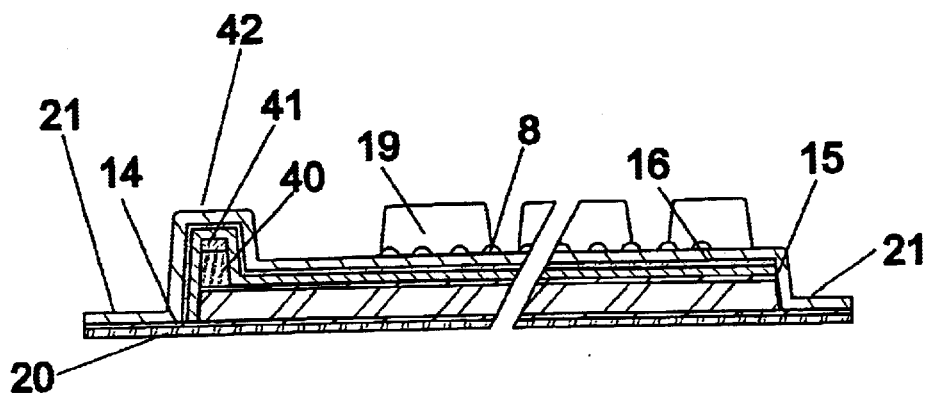
Figure 11A:
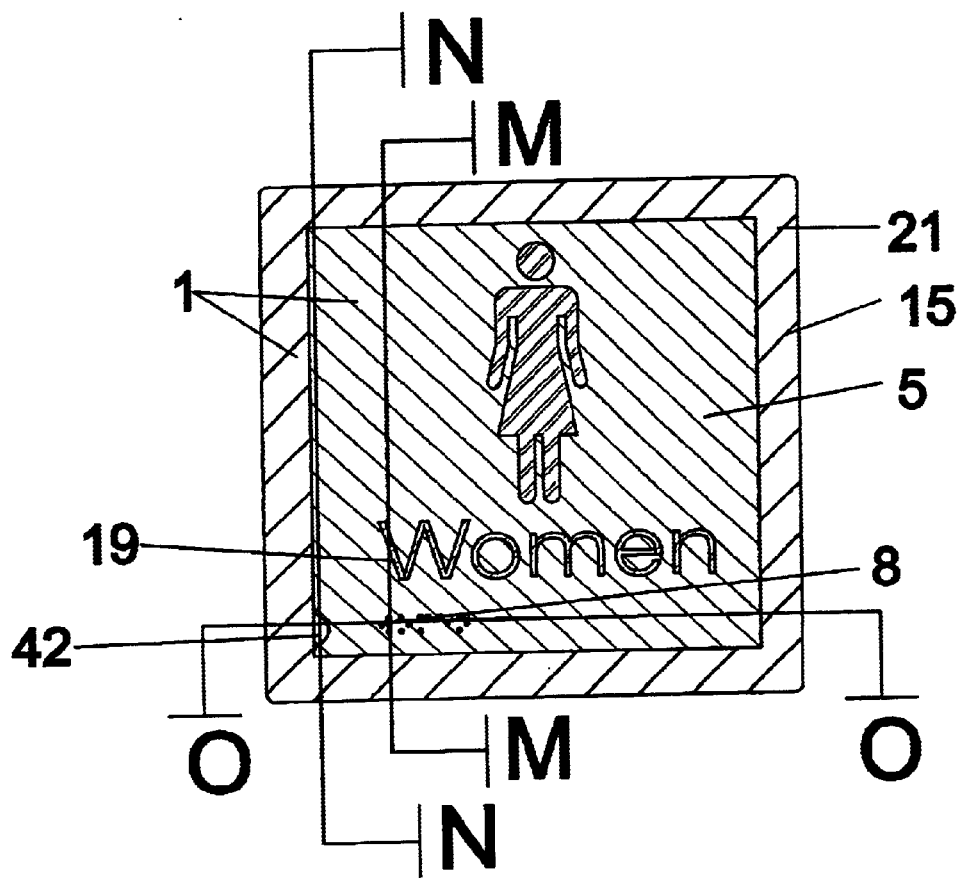
Figure 11B:
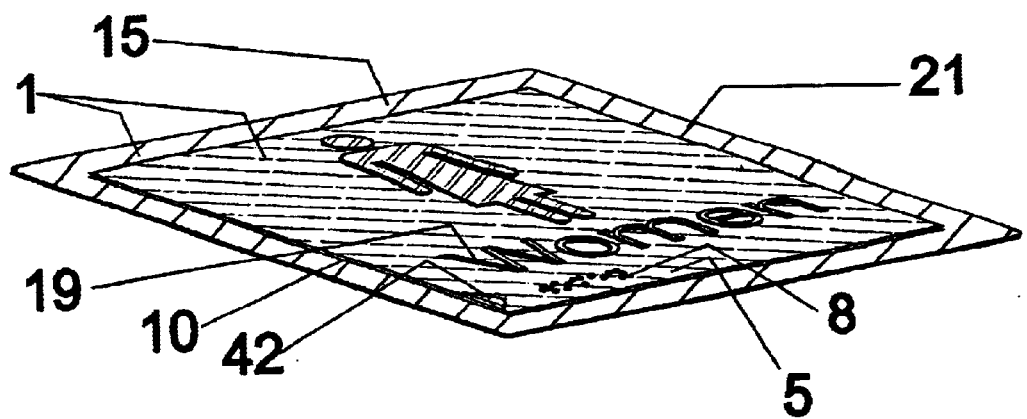

The results, as shown in FIGS. 9 and 10, is that the presence of the raised Braille locator 42 in the background colour layer is not readily apparent, as the raised Braille locator 42 is projecting from a back-ground colour layer 5 of the same colour, and therefore does not contrast with it.

The raised Braille indicator is convenient as it may be less costly to install in a sign. It has the same advantages as the recessed indicator, i.e.: it is unobtrusive and directs the blind reader to the Braille. However, it is really another raised character and can be produced at the same time as the other raised characters. This speeds-up the fabrication process. Further advantages are that the laminating adhesive layer 14 and the substrate layer 12 are eliminated. The substrate layer 10 may also be eliminated. Where the sign has a border, the adhesive layer 14 and coloured layer 12 which would otherwise span the notch (FIG. 5B) may also be eliminated.

In all the figures, the Braille characters 8 are raised-up out of the face layer 1. The Braille pattern is created by embossing the face layer 1 to raise its upper surface. Optionally, a filling 18 may be placed in the dimple formed by embossing to give the Braille characters 8 durability.

When reference has been made to "colour" this expression is intended to include surfaces that are black, grey or white.

The foregoing has constituted a description of specific embodiments showing how the invention may be applied and put into use.

The embodiments of the invention in which an exclusive property are claimed as follows:

1. A raised surface sign comprising:
   (1) a sign face layer, wherein the sign face layer comprises a substantially transparent, conformable, thermoplastic sheeting having an exposed face surface with Braille characters raised thereon;
   (2) one or more visual characters underlying the sign face layer;
   (3) one or more raised, 3-D characters in the form of a 3-D layer positioned beneath and in register with the one or more visual characters;
   (4) a principal background colour layer, underlying either the one or more visual characters or both the one or more visual characters and the 3-D characters and having an outer principal background colour layer border with and a colour layer surface having a specific colour; and
   (5) a substrate layer underlying the principal background colour layer and having a substrate underside and top side surface and a substrate border with a region of the substrate border that is displaced vertically with respect to the top side surface to form a Braille locator region wherein the Braille locator region is spanned by a coloured Braille locator spanning surface that is of the same colour as the colour of the surface of the outer colour layer border to minimize visual contrast along the substrate border between the Braille locator region and the outer layer border.

2. A sign as in claim 1 wherein the principal background colour layer spans the Braille locator region to provide the coloured Braille locator spanning surface.

3. A sign as claimed in claim 1 comprising a secondary background layer that spans the Braille locator region in the plane of said substrate underside surface, said secondary background layer being coloured over such Braille locator region to provide said Braille locator spanning surface that is the same colour as said colour layer surface.

4. A sign as in claim 3 comprising a backing with an outer backing border that extends beyond the substrate border, said outer backing border being of a colour differing from the colour of the principal background colour layer, and wherein said backing carries said secondary background colour layer.

5. A sign as in claim 1 comprising a backing that provides an outer backing border that extends beyond the substrate border, said outer backing border being of a colour differing from the colour of the outer colour layer border, and wherein the principal background colour layer spans the Braille locator region to provide the coloured Braille locator spanning surface.

6. A sign as in claim 1 wherein the sign face layer spans the Braille locator region.

7. A sign as in claim 1 wherein the substrate border around the Braille locator region has a vertical face surface and the sign face layer covers said vertical face surface.

8. A sign as in claim 1 wherein the Braille locator region is elevated above the topside surface of the principal background colour layer which is adjacent to the Braille locator region.

9. A sign as in claim 1 wherein the Braille locator region is depressed below the top side surface of the principal background colour layer to provide a notch which is adjacent to the Braille locator region.

10. A raised surface sign comprising:
    (a) a principal surface layer with a coloured surface and an outside border, said principal surface layer having a Braille portion in the form of a row of Braille characters present thereon,
    (b) a Braille locator region positioned along said outside border of said principal surface layer at a location in general alignment with said row of Braille characters, said Braille locator region having a portion of the principal surface layer adjacent to said Braille locator region, said Braille locator region being elevated above or depressed below the portion of the principal surface layer adjacent thereto, and
    (c) a coloured masking layer that spans the Braille locator region, said coloured masking layer having a coloured surface that is of the same colour as the colour of directly adjacent visible portions of the coloured surface of the principal surface layer of the sign,
   whereby the visual presence of the Braille locator region is masked by said coloured masking layer.

11. A sign as in claim 10 wherein said Braille locator region is elevated above the portion of the principal surface layer adjacent thereto.

12. A sign as in claim 10 wherein said Braille locator region is depressed below the portion of the principal surface layer adjacent thereto.

* * * * *